US010974855B2

(12) United States Patent
Infante et al.

(10) Patent No.: US 10,974,855 B2
(45) Date of Patent: Apr. 13, 2021

(54) SHELF-STABLE POUCH FOR FRESH-PACKED FRUITS OR VEGETABLES

(71) Applicant: CONAGRA FOODS RDM, INC., Chicago, IL (US)

(72) Inventors: Michael Infante, Parsippany, NJ (US); Marcus Jones, Fairlawn, OH (US); Monica J. Turel, Berkeley Heights, NJ (US); Louise Jacques-O'hare, Whitby (CA)

(73) Assignee: Conagra Foods RDM, Inc., Chicago, IL (US)

( * ) Notice: Subject to any disclaimer, the term of this patent is extended or adjusted under 35 U.S.C. 154(b) by 94 days.

(21) Appl. No.: 15/227,377

(22) Filed: Aug. 3, 2016

(65) Prior Publication Data

US 2017/0036791 A1 Feb. 9, 2017

Related U.S. Application Data

(60) Provisional application No. 62/200,936, filed on Aug. 4, 2015.

(51) Int. Cl.
*B65B 25/00* (2006.01)
*B65B 63/08* (2006.01)
(Continued)

(52) U.S. Cl.
CPC .......... *B65B 25/001* (2013.01); *A23B 7/0056* (2013.01); *A23B 7/148* (2013.01);
(Continued)

(58) Field of Classification Search
CPC ......... A23B 7/00; A23B 7/005; A23B 7/0053; A23B 7/0056; A23B 7/01; A23B 7/012; A23B 7/14; A23B 7/144; A23B 7/148; A23B 7/157; A23B 7/152; A23B 7/153; A23B 7/154; A23B 7/158; A23B 7/10; A23B 7/105; A23B 7/06; A23L 3/02;
(Continued)

(56) References Cited

U.S. PATENT DOCUMENTS 2,060,736 A * 11/1936 Loetscher ............ A23B 7/0056
426/397
2,354,590 A * 7/1944 Gilfillan ................. B65D 65/40
156/182
(Continued)

OTHER PUBLICATIONS

Pickle pH NPL, published Feb. 24, 2006, https://web.archive.org/web/20060224220940/https://www.engineeringtoolbox.com/food-ph-d_403.html (Year: 2006).*
(Continued)

*Primary Examiner* — Drew E Becker
*Assistant Examiner* — Bryan Kim
(74) *Attorney, Agent, or Firm* — Ryan T. Grace; Advent, LLP

(57) ABSTRACT

An assembly may include a shelf-stable pouch for fruits or vegetables. The assembly may comprise a pouch having a closed condition and an open configuration. The closed configuration may be configured to seal portions of at least one of the fruits and vegetables and brine prior to heating the pouch for pasteurization. The open condition may allow for the removal and serving of the portions after pasteurization from heating.

6 Claims, 5 Drawing Sheets

(51) Int. Cl.
    *B65D 81/24*     (2006.01)
    *A23B 7/157*     (2006.01)
    *B65D 81/34*     (2006.01)
    *B32B 15/08*     (2006.01)
    *A23B 7/148*     (2006.01)
    *B65D 81/20*     (2006.01)
    *B65D 81/22*     (2006.01)
    *B32B 27/36*     (2006.01)
    *B65B 65/00*     (2006.01)
    *B32B 27/32*     (2006.01)
    *B65D 75/00*     (2006.01)
    *B32B 15/20*     (2006.01)
    *B32B 27/08*     (2006.01)
    *B32B 7/12*     (2006.01)
    *B65B 31/04*     (2006.01)
    *B65B 25/04*     (2006.01)
    *A23B 7/005*     (2006.01)
    *A23L 3/3418*     (2006.01)
    *B65B 7/02*     (2006.01)
    *B65B 55/14*     (2006.01)
    *B65B 51/22*     (2006.01)
    *B65B 55/06*     (2006.01)

(52) U.S. Cl.
CPC ............ *A23B 7/157* (2013.01); *A23L 3/3418* (2013.01); *B32B 7/12* (2013.01); *B32B 15/08* (2013.01); *B32B 15/20* (2013.01); *B32B 27/08* (2013.01); *B32B 27/32* (2013.01); *B32B 27/322* (2013.01); *B32B 27/36* (2013.01); *B65B 25/041* (2013.01); *B65B 31/042* (2013.01); *B65B 63/08* (2013.01); *B65B 65/003* (2013.01); *B65D 75/008* (2013.01); *B65D 81/2084* (2013.01); *B65D 81/22* (2013.01); *B65D 81/24* (2013.01); *B65D 81/3415* (2013.01); *B65D 81/3438* (2013.01); *A23V 2002/00* (2013.01); *B32B 2255/10* (2013.01); *B32B 2255/205* (2013.01); *B32B 2307/304* (2013.01); *B32B 2307/7242* (2013.01); *B32B 2307/7246* (2013.01); *B32B 2439/46* (2013.01); *B32B 2439/70* (2013.01); *B65B 7/02* (2013.01); *B65B 31/04* (2013.01); *B65B 51/225* (2013.01); *B65B 55/06* (2013.01); *B65B 55/14* (2013.01)

(58) Field of Classification Search
CPC . A23L 3/022; A23L 3/04; A23L 3/045; A23L 3/06; A23L 3/065; A23L 3/08; A23L 3/085; A23L 3/10; A23L 3/12; A23L 3/14; A23L 19/03; A23L 19/20; A23L 3/025; A23L 3/027; A23L 3/3409; A23L 3/34095; A23L 3/3418; A23L 3/3445; A23L 19/05; B65B 25/001; B65B 7/00; B65B 7/02; B65B 7/024; B65B 7/04; B65B 7/041; B65B 31/04; B65B 31/042; B65B 31/046; B65B 31/048; B65B 31/06; B65B 16/34; B65B 25/22; B65B 29/08; B65B 31/00; B65B 31/02; B65B 31/024; B65B 31/041; B65D 81/22
See application file for complete search history.

(56) References Cited

U.S. PATENT DOCUMENTS

| | | | | | |
|---|---|---|---|---|---|
| 3,255,019 A | * | 6/1966 | Engelland | ................ | A23B 7/10 426/49 |
| 3,403,032 A | * | 9/1968 | Etchells | ................... | A23B 7/10 426/8 |
| 3,539,359 A | * | 11/1970 | Murchison | ............ | A23L 3/3454 426/113 |
| 3,578,466 A | * | 5/1971 | Luckmann | ............... | A23B 7/10 426/267 |
| 3,939,287 A | * | 2/1976 | Orwig | .................... | A23L 3/3409 422/32 |
| 4,081,942 A | * | 4/1978 | Johnson | .................... | B65B 7/06 53/407 |
| 4,172,914 A | * | 10/1979 | Festag | ..................... | B32B 15/08 428/35.9 |
| 4,291,085 A | * | 9/1981 | Ito | ........................... | B32B 27/00 428/215 |
| 4,323,586 A | * | 4/1982 | Long | ..................... | B65D 31/02 206/484 |
| 4,352,827 A | * | 10/1982 | Fleming | ................. | A23B 7/144 426/270 |
| 4,453,368 A | * | 6/1984 | Egee | ...................... | B65B 25/04 198/418 |
| 4,547,389 A | * | 10/1985 | Palnitkar | ................. | A23L 19/20 426/397 |
| 4,789,558 A | * | 12/1988 | Winkler | .................... | A23B 7/08 426/639 |
| 4,832,963 A | | 5/1989 | Demeulemeester | ........................ | A23B 7/0056 426/8 |
| 4,844,929 A | * | 7/1989 | Kingsley | .................. | A23B 7/10 426/326 |
| 4,883,679 A | * | 11/1989 | Sewon | ..................... | A23B 7/10 426/532 |
| 5,094,864 A | * | 3/1992 | Pinon | ..................... | A23B 4/005 426/233 |
| 5,192,565 A | * | 3/1993 | Buhler | ................. | A23B 7/0053 426/49 |
| 5,482,727 A | * | 1/1996 | LaBorde | ................. | A23B 7/06 426/270 |
| 5,922,383 A | * | 7/1999 | Cook | ..................... | A23B 7/015 426/324 |
| 6,056,985 A | * | 5/2000 | Fluckiger | ............... | B65D 75/52 374/137 |
| 6,079,191 A | * | 6/2000 | Borkiewicz | ............ | B65B 19/34 53/236 |
| 6,139,898 A | * | 10/2000 | Meyer | ..................... | A23L 7/196 426/114 |
| 8,420,140 B2 | * | 4/2013 | Nafisi-Movaghar | ........................ | A23B 7/015 205/740 |
| 8,425,962 B2 | * | 4/2013 | Palleschi | ................. | A23B 7/154 426/321 |
| 8,663,723 B2 | * | 3/2014 | Borkiewicz | ............... | B65B 5/10 426/397 |
| 9,505,504 B2 | * | 11/2016 | Murray | ................. | B65B 31/042 |
| 9,957,069 B2 | * | 5/2018 | Ishikawa | .................. | B65B 1/04 |
| 2002/0119227 A1 | * | 8/2002 | Rosenblum | ............ | B65B 3/027 426/411 |
| 2008/0134646 A1 | * | 6/2008 | Yasuhira | .................. | B65B 31/06 53/512 |
| 2009/0022858 A1 | * | 1/2009 | Pawlick | ................. | B65D 81/34 426/113 |
| 2009/0092720 A1 | * | 4/2009 | Trude | .................... | B65D 1/0276 426/397 |
| 2009/0311390 A1 | * | 12/2009 | Phelps | ................. | B65B 25/067 426/129 |
| 2010/0247725 A1 | * | 9/2010 | Krijgsman | ............ | A23B 7/148 426/395 |
| 2012/0276258 A1 | * | 11/2012 | Nafisi-Movaghar | ........................ | A23B 7/085 426/270 |
| 2012/0279180 A1 | * | 11/2012 | Crawford | ................ | B65B 31/06 53/432 |
| 2013/0183414 A1 | * | 7/2013 | Song | ....................... | A23L 19/05 426/138 |
| 2014/0272014 A1 | * | 9/2014 | Janicke | ................... | A23B 7/10 426/106 |
| 2015/0072051 A1 | * | 3/2015 | Sigal | ...................... | A23N 4/085 426/102 |

(56) References Cited

U.S. PATENT DOCUMENTS

| | | | |
|---|---|---|---|
| 2015/0342206 A1* | 12/2015 | Berger | A23L 13/70 99/532 |
| 2016/0090202 A1* | 3/2016 | Newman | B65B 51/02 426/413 |
| 2016/0270432 A1* | 9/2016 | Lin | A23L 3/02 |

OTHER PUBLICATIONS

Rubber Hydrochloride NPL, citation to Bunn and Garner, The Crystal Structure of Rubber Hydrochloride, Rubber chemistry and technology, Dec. 1943, vol. 16, No. 4, pp. 848-856, http://rubberchemtechnol.org/doi/abs/10.5254/1.3540166 (Year: 1943).*

* cited by examiner

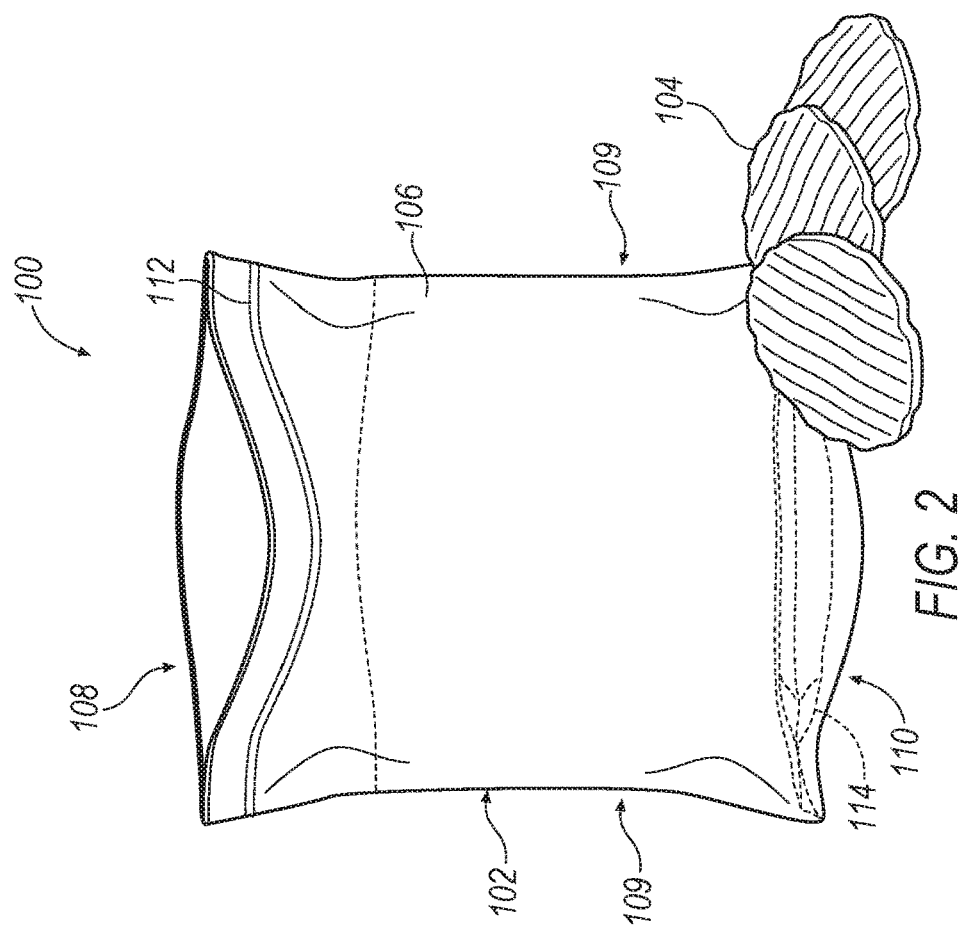
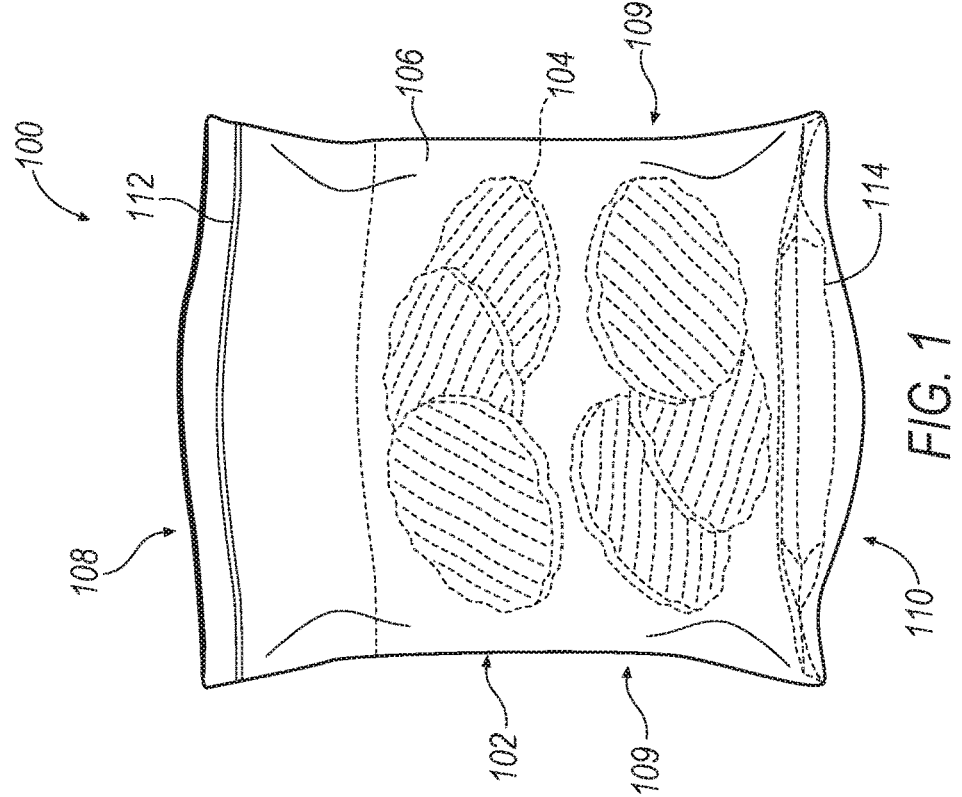

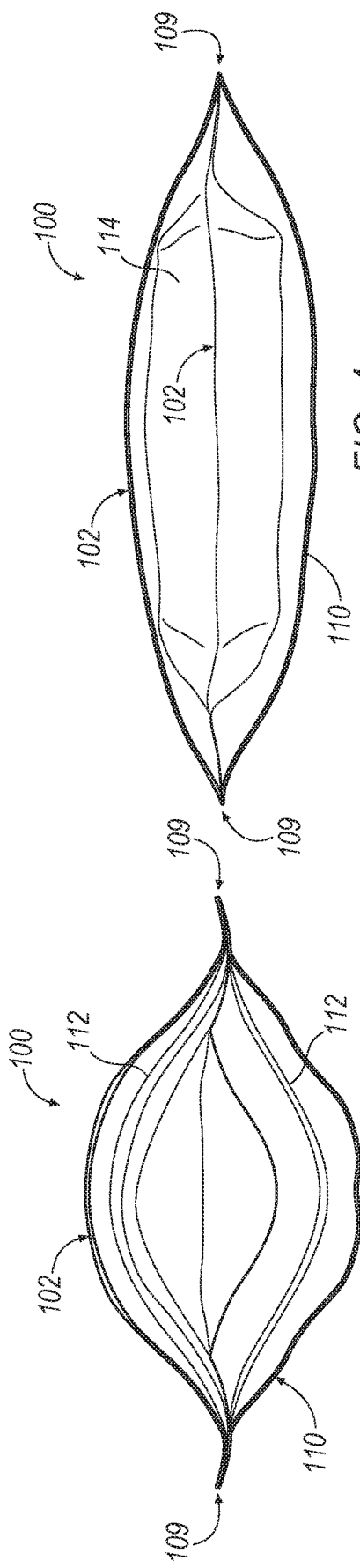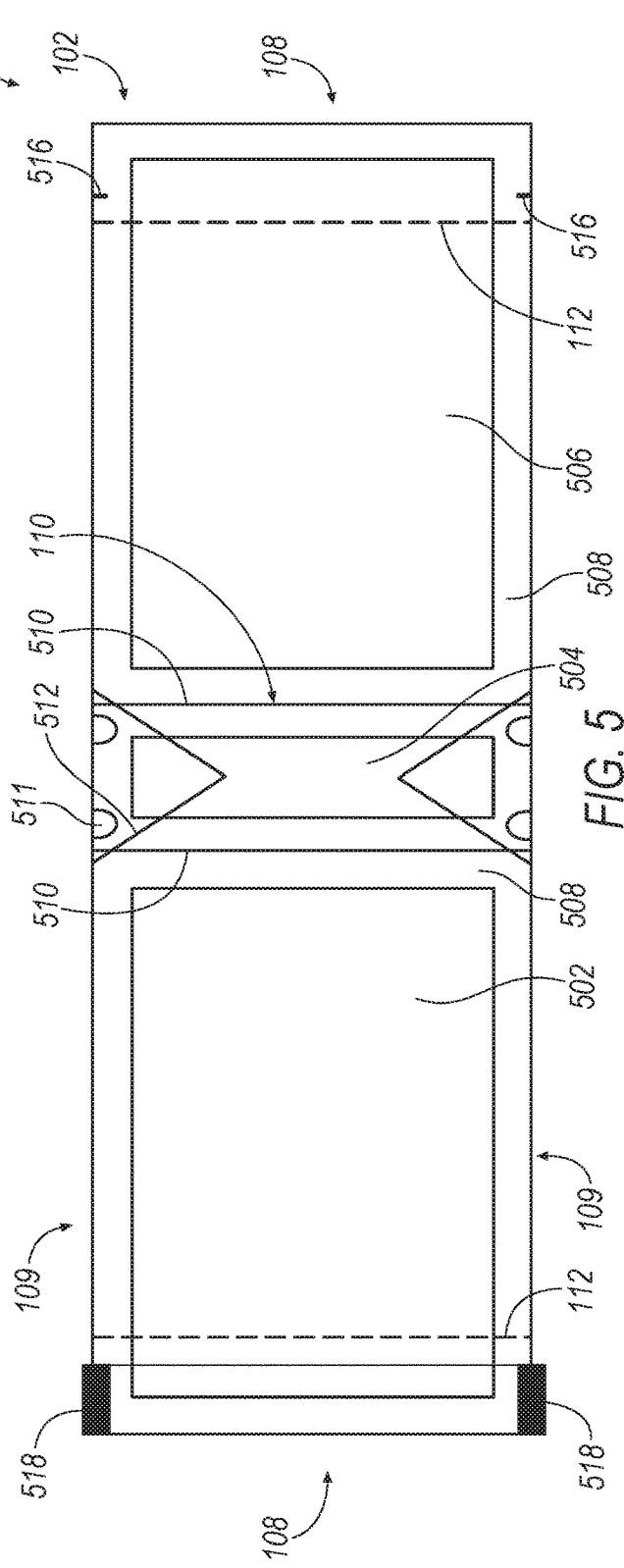

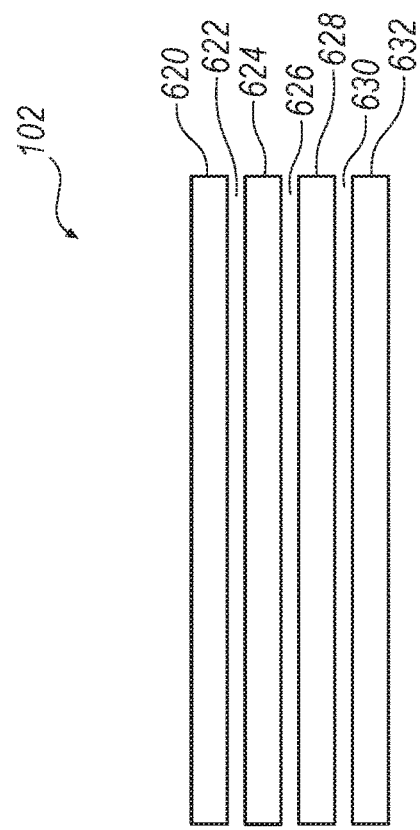
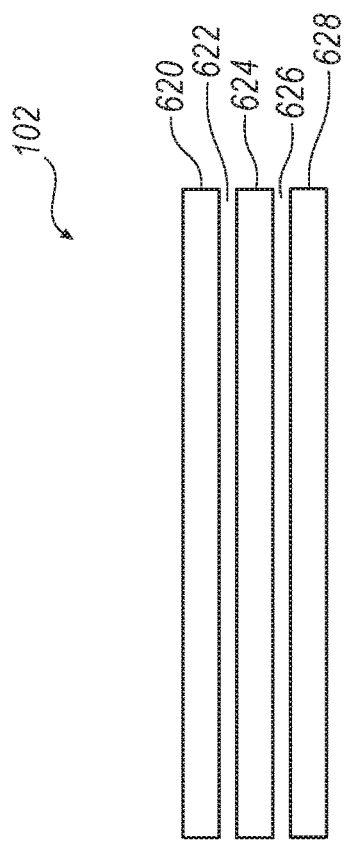

SHELF-STABLE POUCH FOR FRESH-PACKED FRUITS OR VEGETABLES

CROSS REFERENCE TO RELATED APPLICATIONS

This non-provisional application is based on and claims priority to U.S. Provisional Patent Application No. 62/200,936, filed on Aug. 4, 2015, which is hereby incorporated by reference in its entirety.

BACKGROUND

Vegetables or fruits such as cucumbers (sometimes considered a culinary vegetable), also referred to as gherkins, may be processed to be shelf-stable, so that they may be stored and distributed in non-refrigerated conditions. Traditionally, pickles may be made from vegetables or fruits such as cucumbers and packaged in glass jars to retain freshness and quality. While the glass jar product represents a taste and texture that is desirable to the consumers, customers may desire cucumbers that are freshly packed in a portable format, e.g., using flexible packaging for convenient, on-the-go snacking. Products in flexible packaging, however, may require different processing than those in glass jars, thereby providing a need for improved methods for products in flexible packaging. Furthermore, most pickles are packaged in jars which are not conducive to a single serving portion of a whole or sectioned pickle. Moreover, traditional pouches do not insulate the pickles from oxygen that may enhance spoilage. Thus, there is a need for fresh-packed vegetables or fruits such as cucumbers, e.g., in a single serving portion and using a shelf-stable pouch that minimizes spoilage.

BRIEF DESCRIPTION OF THE DRAWINGS

FIG. 1 illustrates an exemplary assembly of the present disclosure, e.g., including a pouch in a closed configuration and containing a fruit or vegetable illustrated in the form of a cucumber and brine;

FIG. 2 illustrates an exemplary assembly of the present disclosure, e.g., including a pouch in an open configuration, containing brine, and with at least a portion of the exemplary pickles that result from the pickles being separated from the packaging and the brine;

FIG. 3 illustrates a top view of a pouch of the present disclosure, e.g., in an open configuration;

FIG. 4 illustrates a bottom view of a pouch of the present disclosure;

FIG. 5 illustrates an exemplary die line layout for a pouch of the present disclosure;

FIG. 6A illustrates an exemplary material for a pouch of the present disclosure, e.g., having a plurality of layers such as three;

FIG. 6B illustrates another exemplary material for a pouch of the present disclosure, e.g., having a plurality of layers such as four;

DETAILED DESCRIPTION

Figure 7:
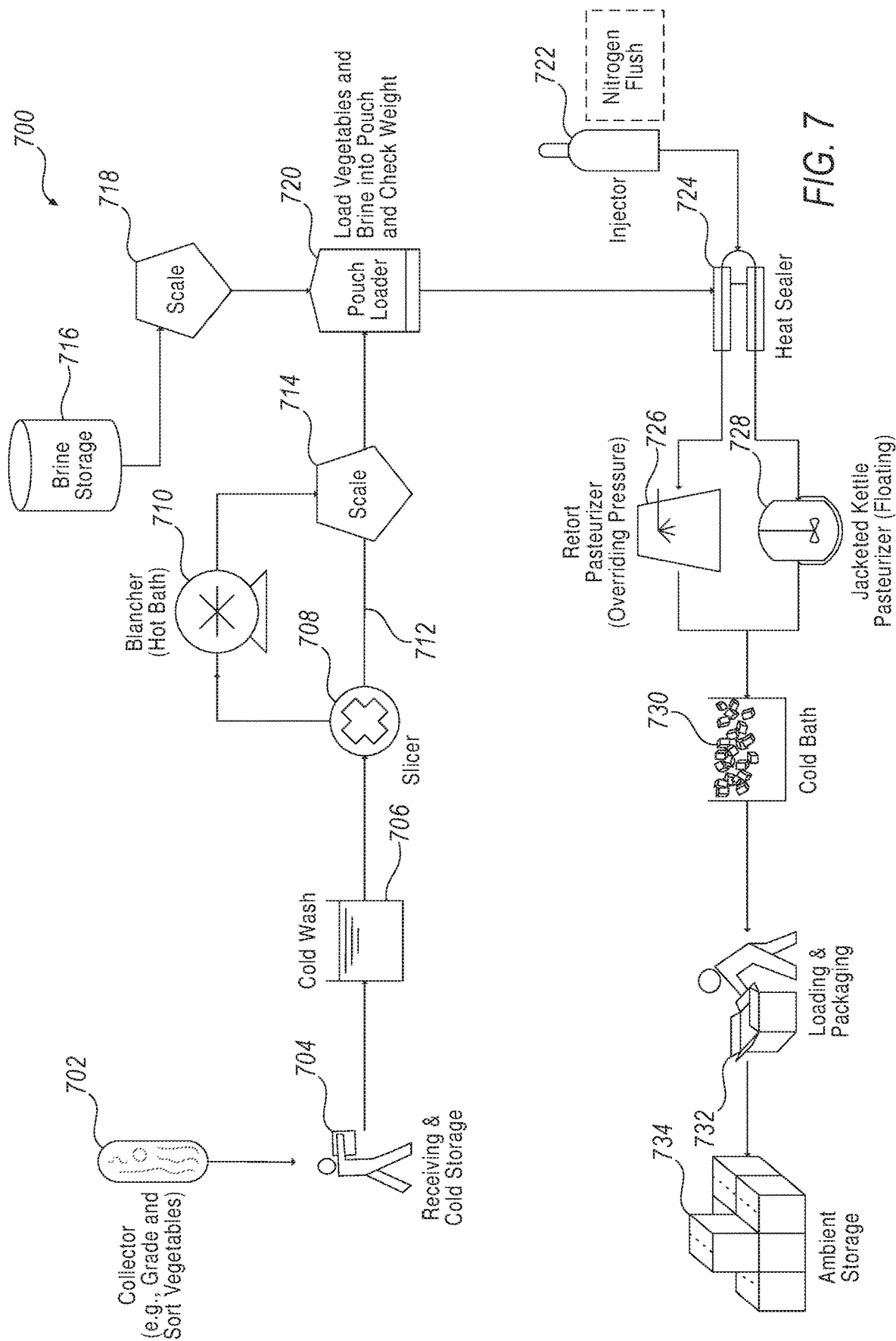
FIG. 7 illustrates an exemplary process of the present disclosure.

An assembly may include a shelf-stable pouch for fruits or vegetables such as fresh cucumbers. The assembly may comprise a pouch having a closed condition and an open configuration. The closed configuration may be configured seal fruits or vegetables and brine prior to heating the pouch for pasteurization. Brine is water saturated with or containing large amounts of a salt, especially sodium chloride. After pasteurization from heating, the open condition may allow for the removal and serving of portions (e.g., sectioned) of the treated fruits or vegetables.

Methods for a shelf-stable pouch for fruits or vegetables are also contemplated. The method may comprise subdividing at least one of a fruit and vegetable into portions such as by cutting or slicing them into sections, combining at least a subset of the resulting portions and a brine in a pouch, removing oxygen from the pouch, sealing the pouch to form a sealed pouch, heating the sealed pouch for pasteurization, and cooling the sealed pouch after pasteurization from the heating. In the illustration that follows, an exemplary fruit in the form of a cucumber is treated to become a form of a pickle. Of course, other fruits or vegetables may also be used including, but not limited to olives, asparagus, cauliflower and carrots. In fact, mixtures of fruits and vegetables are also possible.

FIGS. 1-4 illustrate an exemplary assembly 100. System 100 may take many different forms and include multiple and/or alternate components and/or implementations. While an exemplary assembly 100 is shown, the exemplary components illustrated in the figures are not intended to be limiting. Indeed, additional or alternative components and/or implementations may be used.

As illustrated in FIGS. 1-4, assembly 100 may include a pouch 102, one or more food portions 104 (e.g., vegetables such cucumbers, fruit, or a combination thereof), a brine 106, an upper portion 108, first and second side portions 109, a lower portion 110, a releasable seal 112 (e.g., near the upper portion 108), and a recess 114 (e.g., near the lower portion 110). An exemplary pouch 102 may include a cavity configured to contain portions 104 and brine 106. Portions 104 may be fresh or fresh-packed, e.g., by packaging a fruit or vegetable from a harvest site such as a field without or prior to a lengthy fermentation or storage period. Portions 104 may be processed as a single serving portion of a whole fruit or vegetable or formed into and processed as sections, e.g., transverse slices referred to as chips or lengthwise slices referred to as spears.

Pouch 102 may include a closed configuration and an opened configuration. As shown in FIG. 1, the closed configuration may contain the portions 104 and brine 106. Alternatively, the closed configuration may contain the portion 104 without brine 106. As shown in FIGS. 2 and 3, the open configuration may facilitate the packaging or serving of portions 104, e.g., while the brine 106 remains in the pouch 102 or is disregarded. The releasable seal 112 may include first and second interlocking portions that releasably receive and selectively release each other, e.g., to seal the portion 104 and brine 106 in the pouch 102 thereby isolating the portions 104 from outside oxygen that may increase spoilage. As shown in FIG. 4, the recess 114 may be configured as a gusset for which the perimeter may provide a stand for the pouch 102 to be positioned upright, e.g., on a shelf.

FIG. 5 illustrates an exemplary die line layout 500 for the forming pouch 102. Pouch 102 may include a back panel 502, a gusset panel 504, and a front panel 506. The pouch 102 may include seal areas 508 that may be put in contact with and heat sealed relative to each other, thereby providing seals along the lower portion 110 and side portions 109. Further, after the portions 104 and brine 106 are loaded into the pouch 102 as discussed in further detail below, the seal area 508 near the upper portion 110 may also be heat sealed. The pouch 102 may include fold lines 510, 511, and 512 to facilitate the formation of gusset panel 504. The pouch 102 may include first and second interlocking portions of releasable seal 112 along the back panel 502 and front panel 506, respectively. The pouch 102 may include notch 516 and eyemark 518 to facilitate the tear and removal of the seal area 508 portion beyond the notch 516 to expose releasable seal 112.

FIGS. 6A and 6B illustrate an exemplary construction of pouch 102. As shown in FIG. 6A, pouch 102 may include a first layer 620 (e.g., facing and exposed to an environment surrounding pouch 102), an adhesive 622, a second layer 624, an adhesive 626, and a third layer 628 (e.g., facing and exposed to the portions 104 and brine 106). As shown in FIG. 6B, pouch 102 may additionally include an adhesive 630 and a fourth layer 632 (e.g., facing and exposed to the portions 104 and brine 106). For example, the first layer 102 may include any oxygen barrier such as polyethylene (e.g., polyethylene terephthalate (PET)), the second layer 624 may include any light or thermal barrier such as metal foil (e.g., tin or aluminum foil) or metallized film (e.g., metalized polyester film (MetPET)), and the third layer 128 may include any hermetic or airtight barrier such as polyethylene (e.g., linear low-density polyethylene (LLDPE)) or polypropylene (e.g., cast polypropylene (CPP)). In another example, the first layer 620 may include a first oxygen barrier (PET), the second layer 624 may include any light or thermal barrier (e.g., metal foil or metallized film), the third layer 628 may include a second oxygen barrier (e.g., PET), and the fourth layer 632 may include any hermetic or airtight barrier (e.g., LLDPE or CPP). Adhesives 622, 626, and 630 may include the same type or any combination of adhesives. Alternatively, or in addition, a heat seal may secure any portion or combination of layers 620, 622, 624, 626, 628, and 632 to each other.

FIG. 7 illustrates an exemplary system 700. System 700 may take many different forms and include multiple and/or alternate components and/or implementations. While an exemplary system 700 is shown, the exemplary components illustrated in this Figure are not intended to be limiting. Indeed, additional or alternative components and/or implementations may be used.

As illustrated in FIG. 7, system 700 may include collector 702, receiving and cold storage 704, cold wash 706, slicer 708, blancher 710, bypass 712, scale 714, brine storage 716, scale 718, pouch loader 720, injector 722, heat sealer 724, retort pasteurizer 726, jacketed kettle pasteurizer 728, ice bath 730, loading and packaging 732, and ambient storage 734.

The collector 702 may grade and sort fruits or vegetable and then the fruits or vegetable may be sent to receiving and cold storage 704. The fruit or vegetable may be passed through cold wash 706 that may soak or rinse the fruit or vegetable, e.g. at a temperature of at or above 50 degrees Fahrenheit (° F.). The slicer 708 may slice the fruit or vegetable into sections 104, e.g., having thickness of about ⅜ to 7/32 of an inch.

Next, the portions 104 may be blanched. Blanching may reduce the taste typically associated with raw or uncooked portions 104 such as cucumbers, e.g., by activating enzymes. The portions 104 may be passed to that blancher 710 that may include a hot bath, e.g., of water at 130-140° F. having a predetermined dwell time. After blanching for a predetermined dwell time, the portions 104 may be passed to scale 714, e.g., to be weighed and portioned such as for a single serving portion. Alternatively, the portions 104 may not be blanched and may instead pass directly to scale 714, as illustrated by bypass 712.

The portions 104 may be combined with brine 106. The brine 106 may be stored in brine storage 716. The brine 106 may include a solution of salt in water, e.g., ranging from about 3.5 to 26% salt. The brine 106 may pass to scale 718, e.g., to be weighed and portioned such as for a single serving portion. The portions 104 and brine 106 may be loaded into a pouch 102 in a single serving portion, e.g., a one-to-one ratio of portions 104 to brine 106 or approximately 50 grams of portions 104 and 50 grams of brine 106. Thus, less brine may be utilized than under more traditional processes.

The portions 104 and brine 106 may be sealed in the pouch 102 to form a sealed pouch 102. Referring again to FIG. 1, the pouch 102 may include an upper portion 108 with a selectively sealable closure and a lower portion 110 with a gusset 114 to allow the sealed pouch 102 to be freestanding, e.g., on a shelf. The pouch 102 may also include any material configured to isolate the portions 104 and brine 106 from oxygen, e.g., to preserve the portions 104 in a shelf-stable condition.

Oxygen may be removed from the pouch 102. For example, the injector 722 may be positioned in the upper portion of the pouch 102 and may nitrogen flush the oxygen from the portions 104 and brine 106, e.g., by injecting an inert gas such as a gas comprising nitrogen into the pouch 102, thereby forcing the oxygen away from the portions 104 and brine 106 and out of the pouch 102. Inert gases help avoid inadvertent oxidation and the like resulting from the presence of oxygen. The heat sealer 724 may resistively heat or ultrasonically weld the upper portion of the pouch 102 to seal the portions 104 and brine 106 in the pouch 102, thereby isolating the portions 104 from oxygen.

The sealed pouch 102 may be pasteurized to cure the portions 104 in the brine 106 and make the sealed pouch 102 self-stable under non-refrigerated conditions, e.g., by destroying certain microorganisms that may cause spoilage or undesirable fermentation. The sealed pouch 102 may be pasteurized by exposing the sealed pouch 102 to an elevated temperature for a predetermined pasteurization period according to a desired pasteurization value, e.g., in a range of 0 to 200, 15 to 50, 30 to 75, or 50 to 100. The sealed pouch 102 may be pasteurized with a pasteurizer such as the retort pasteurizer 726 or the jacketed kettle pasteurizer 728. The retort pasteurizer 726 may include a chamber that pressurizes and sprays steam at the sealed pouch 102, thereby elevating the temperature of the sealed pouch 102. The jacketed kettle pasteurizer 728 that allows the sealed pouches 102 to float in hot liquid, e.g., water. After the predetermined pasteurization period, the sealed pouch 102 is placed in a cold bath, e.g., of ice and water at approximately 40-50° F., to cool the sealed pouch 102. The sealed pouch 102 is sent to labeling and packaging 732 along with other sealed pouches 102 and then to ambient storage 734 at room temperature of approximately 70-76° F.

Figure 8:
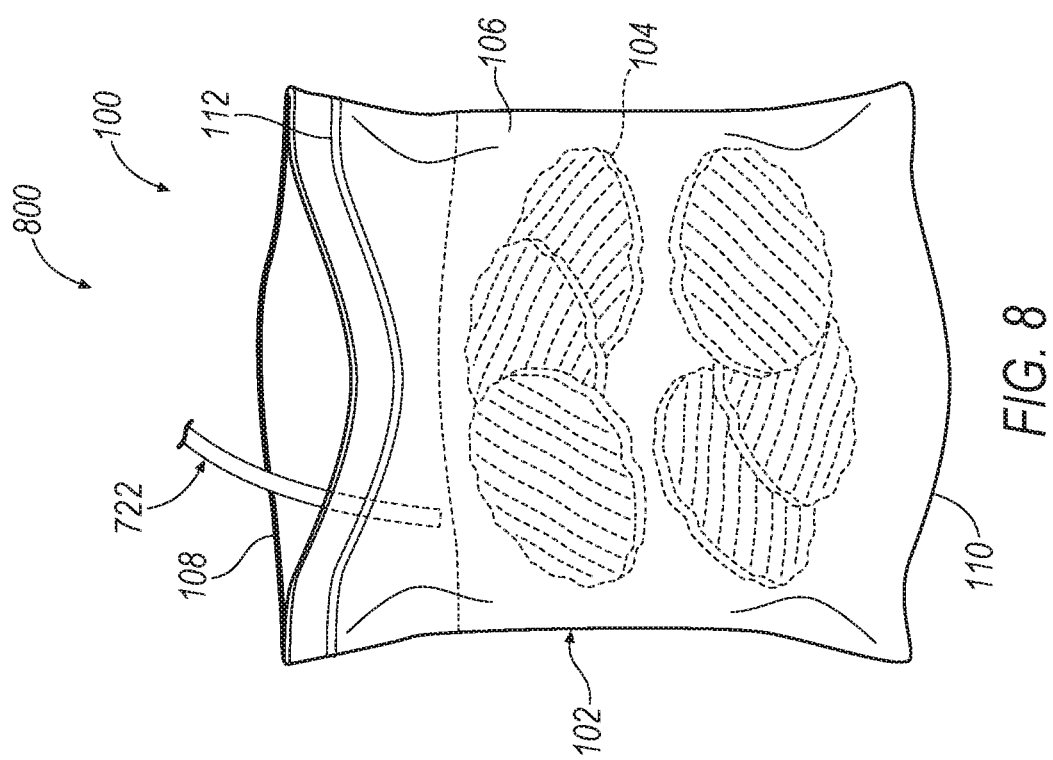
FIG. 8 illustrates an exemplary nitrogen flush of the present disclosure.

FIG. 8 illustrates a system 800 for removing oxygen from the pouch 102. The system 800 may include the injector 722. The injector 722 may include a tube or wand with a passage along its length and that is connected with a nitrogen supply configured to pass or inject nitrogen through the passage. Alternatively or in addition, injector 722 may be configured to provide suction to remove the air containing oxygen from inside the pouch 102. With the portions 104 and brine 106 in the pouch 102 while in an open configuration, the injector 722 may be positioned in the pouch 102, e.g., with a leading end of the injector 722 positioned above (as shown) or in the brine 106. The injector 722 may then inject the nitrogen into the package 102. The injected nitrogen may displace and push all or at least a portion of the oxygen out of the pouch 102, thereby isolating the portions 104 and brine 106 from oxygen. A desirable oxygen percentage in the pouch 102 after nitrogen flushing may be below about 0.25-1% oxygen, although alterative oxygen percentages may be utilized. Thus, the pouch 102 may be nitrogen flushed to minimize spoilage of the vegetables 104 from oxygen.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for a shelf-stable pouch for fresh fruits or vegetables, the method comprising:
   subdividing at least one of a fresh fruit and a vegetable into portions;
   combining at least a subset of the portions and a brine in a pouch, the pouch having a first layer, a second layer, and a third layer interposed between the first layer and the second layer, the third layer including a metal foil or a metallized film;
   positioning, while the combined portions and brine are in the pouch, an injector above or in the brine and passing an inert gas into the pouch while the portions and brine are in the pouch to remove oxygen from the pouch;
   sealing the pouch prior to pasteurization to form a sealed pouch having the portions and the brine;
   heating the sealed pouch for pasteurization of the portions in the brine; and
   cooling the sealed pouch after pasteurization from the heating, thereby providing the shelf-stable pouch configured for ambient storage of the portions in the brine.

2. The method of claim 1, further comprising positioning the injector into at least a portion of the pouch while the portions and brine are in the pouch.

3. The method of claim 2, wherein the heating includes at least one of spraying the sealed pouch of portions and brine with steam and floating the sealed pouch in liquid according to a desired pasteurization value in a range consisting of at least one of 15 to 50, 30 to 75, and 50 to 100, and the cooling after pasteurization includes placing the sealed pouch of portions and brine in a cold bath of ice and water at 40 to 50 degrees Fahrenheit.

4. The method of claim 1, wherein removing oxygen includes pushing the oxygen out of the pouch and away from the portions.

5. The method of claim 1, wherein pickles are formed after pasteurizing the sealed pouch.

6. The method of claim 1, wherein the portions include cucumbers.

* * * * *